United States Patent
Gabrys et al.

(10) Patent No.: US 10,749,419 B2
(45) Date of Patent: Aug. 18, 2020

(54) PROCESS FOR ASSEMBLY OF MOTOR-GENERATORS

(71) Applicants: Christopher W. Gabrys, Reno, NV (US); Timothy S. Rodgers, Bainbridge Island, WA (US)

(72) Inventors: Christopher W. Gabrys, Reno, NV (US); Timothy S. Rodgers, Bainbridge Island, WA (US)

(73) Assignee: Revolution Electric Motor Company, Inc., Reno, NV (US)

( * ) Notice: Subject to any disclaimer, the term of this patent is extended or adjusted under 35 U.S.C. 154(b) by 263 days.

(21) Appl. No.: 15/768,925

(22) PCT Filed: Sep. 28, 2017

(86) PCT No.: PCT/US2017/054080
§ 371 (c)(1),
(2) Date: Apr. 17, 2018

(87) PCT Pub. No.: WO2018/064370
PCT Pub. Date: Apr. 5, 2018

(65) Prior Publication Data
US 2019/0058379 A1    Feb. 21, 2019

Related U.S. Application Data

(60) Provisional application No. 62/401,792, filed on Sep. 29, 2016.

(51) Int. Cl.
*H02K 15/02* (2006.01)
*H02K 15/10* (2006.01)
(Continued)

(52) U.S. Cl.
CPC .............. *H02K 15/08* (2013.01); *H02K 1/06* (2013.01); *H02K 3/30* (2013.01); *H02K 3/32* (2013.01);
(Continued)

(58) Field of Classification Search
CPC ...... H02K 15/08; H02K 1/06; H02K 15/0435; H02K 3/47; H02K 3/32; Y10T 29/49012; H01F 6/06
(Continued)

(56) References Cited

U.S. PATENT DOCUMENTS

4,110,901 A * 9/1978 Nakamura ............... H02K 3/04
29/598
4,607,803 A 8/1986 Nozawa
(Continued)

*Primary Examiner* — Donghai D Nguyen
(74) *Attorney, Agent, or Firm* — J. Michael Neary (57) ABSTRACT

A process for assembling a brushless motor-generator includes assembling a rotor formed from two spaced apart rotor portions having magnetic poles that drive magnetic flux circumferentially through the rotor portions and back and forth across an armature airgap formed between the rotor portions. An air core armature is formed by coating a substantially nonmagnetic armature form with a tacky adhesive layer, and winding armature windings into a winding pattern onto the substantially nonmagnetic form using wire made of multiple individually insulated conductor strands that are electrically connected in parallel but are electrically insulated from each other along their length when located inside the armature airgap, wherein the strands of said wire are diametrically held together by an outer serve. The winding of the armature form includes sequentially applying pressure to sections of said wire against the tacky adhesive layer.

20 Claims, 9 Drawing Sheets

(51) Int. Cl.
*H02K 15/08* (2006.01)
*H02K 3/47* (2006.01)
*H02K 1/06* (2006.01)
*H02K 15/04* (2006.01)
*H02K 3/32* (2006.01)
*H02K 3/30* (2006.01)

(52) U.S. Cl.
CPC ............... *H02K 3/47* (2013.01); *H02K 15/02* (2013.01); *H02K 15/0435* (2013.01); *Y10T 29/49012* (2015.01)

(58) Field of Classification Search
USPC .................................................. 29/596, 598
See application file for complete search history.

(56) References Cited

U.S. PATENT DOCUMENTS

| | | | |
|---|---|---|---|
| 5,099,162 A * | 3/1992 | Sawada | .................. H01F 6/06 310/154.05 |
| 5,606,791 A | 3/1997 | Fougere | |
| 7,888,839 B2 | 2/2011 | Gabrys | |
| 7,977,940 B2 | 7/2011 | Chwala | |
| 8,035,267 B2 * | 10/2011 | Suzuki | .................. H02K 3/26 310/208 |
| 8,714,903 B2 | 5/2014 | Feng | |
| 9,370,867 B2 | 6/2016 | Ilch | |

\* cited by examiner

PROCESS FOR ASSEMBLY OF MOTOR-GENERATORS

This invention pertains to motor-generators for converting between electrical and mechanical energy, and more particularly to a new process for assembly of motor-generators yielding high electro-mechanical energy conversion efficiency and power density. The unique process now makes manufacturing of these machines possible at much higher rates while being highly automated.

BACKGROUND OF THE INVENTION

Electric motor-generators convert between electric and rotary mechanical power. Motors currently consume more than 50% of electrical power produced. There is a great desire to increase the efficiency of electric motors for saving energy and reducing pollution to the environment.

The efficiency of electric motor-generators can potentially be increased by reducing the resistive and magnetic induced losses. Magnetic losses include both hysteresis and eddy current losses and are the result of changing magnetic field through different parts of the motor-generator.

One type of electrical machine that can provide for reduced magnetic induced losses is an air core construction. Air core motor-generators place the windings within a magnetic airgap, and not in slots cut into an iron stator as in conventional electrical machines.

One problem with air core motor-generators is the production of the armatures in mass manufacturing at the lowest possible costs. If they cannot be produced at low costs, they will not be successful. More and more, it is desirable to have manufacturing automated. However, even with traditional motor-generators, there is substantial manual labor in production. To date, air core motor-generators have used significant manual labor and possibly more than traditional electrical machines.

It would be desirable to develop a new process to produce air core motor-generators with the highest possible energy conversion efficiency, that can produce them at a very high rate and be uniquely compatible for automation. Such a new process could make new energy efficient motor-generators widespread and could make a substantial difference in global energy use.

SUMMARY OF THE INVENTION

The invention provides a process for high rate automated production of air core motor-generators that can operate with higher efficiency and power density than conventional motor-generators. The higher performance is achieved through the reduction of resistive and magnetically induced losses including hysteresis and eddy currents from the special construction whereby a circumferentially varying magnetic flux is not passed through a ferromagnetic stator. Up until now, fabrication of such machines has been time consuming and labor intensive, which has limited their adoption. The new process of this invention comprises assembling a rotor formed from two spaced apart rotor portions having magnetic poles that drive magnetic flux circumferentially through the rotor portions and back and forth across an armature airgap formed between said rotor portions. The process further comprises forming an air core armature by coating a substantially nonmagnetic armature form with a tacky adhesive layer, and winding armature windings into a winding pattern on to the substantially nonmagnetic form using wire comprised of multiple individually insulated conductor strands that are electrically connected in parallel but are electrically insulated from each other along their length when located inside the armature airgap. The strands of wire may be diametrically held together by an outer serve to protect them during the winding process. The winding process comprises sequentially applying pressure to sections of the wire against the tacky adhesive layer, wherein tack of the tacky adhesive layer holds the wire to the substantially nonmagnetic armature form while during the winding process, in the winding pattern later required for magnetic torque generation. After completing the windings, the air core armature is inserted into the armature airgap and mounted to the stator of the motor-generator for production of magnetically induced torque between the rotor and the stator. We have found that the winding process is surprisingly very effective because of the combination of uniquely high wire flexibility allowing it to be readily adhered (without significant bending memory) to the tacky adhesive layer on the substantially non-magnetic form. The armature form is substantially non-magnetic, meaning that it could include small amounts of magnetic material if the structural or other benefits exceeds the disadvantages, such as inefficiencies magnetically induced losses including hysteresis and eddy currents In an additional embodiment of the invention, the tacky adhesive layer preferably comprises a film adhesive. The film adhesive is applied to the substantially non-magnetic form prior to the winding process. Many different types of film adhesives can be utilized so long as they possess sufficient tack to hold the wires during the winding process as well as sufficient strength to resist electromagnetic torque during motor-generator operation. Two types of film adhesives are structural adhesives, which can be cured for high strength, and pressure sensitive adhesives that have very high room temperature tack. Unlike conventional manufacturing of air core armatures that utilize potting, no molding is necessary, allowing much higher speed manufacturing. Likewise, no temporary tooling is necessarily for shaping the windings. The windings are formed right onto the substantially non-magnetic form which is later inserted directly into the armature airgap. The motor-generators do not need a laminated steel stator and the windings do not require bonding into a steel stator.

In a further embodiment, the film adhesive comprises a B-staged thermoset polymer film. Structural adhesives such as this typically have lower room temperature tackiness which makes the winding process more difficult. However, the winding can be accomplished at a slightly elevated temperature for high tackiness. After winding is completed, the polymer film maybe further cured for high strength. Preferably the windings are adhered to the substantially non-magnetic form in the active region, portions traversing inside the magnetic flux that generate torque. Windings also comprise end turns which traverse circumferentially and do not generate torque. End turns are not required to be adhered to the form accordingly and may be free and unsupported.

In yet an additional embodiment, the process also comprises multiple individually insulated conductor strands of the wire having a layer of thermoplastic polymer coating. The strands are heated and bonded to each other after the wire has been adhered in the winding pattern to the substantially nonmagnetic armature form. This provides several benefits including increasing the structural stiffness of the air core armature, reducing tendency for the active region portions from peeling off the form and holding the design rigid shape of the end turns to facilitate easier armature insertion into the armature airgap.

The placement of the flexible winding wire into the desired winding pattern for electromagnetic torque production and pressing into the tacky adhesive layer is preferably done by automated process. In an additional embodiment of the invention, the windings are applied to the substantially nonmagnetic armature form by a parallel kinematic robot that forms the winding pattern and applies pressure to the wire against said tacky adhesive layer on the substantially nonmagnetic armature form. Parallel kinematic robots, such as a delta robot, provide the advantage of much higher speed motions than serial robots. A delta robot is a parallel link robot in which its major mechanical axes act on the robot faceplate in parallel rather than in series. This allows both quick and precise movements. Parallel kinematic robots are now being used for pick and placement material handling. However, in accordance with the invention, the delta robot will be used to quickly and accurately place the winding pattern of wires and adhere them to the substantially nonmagnetic form.

In an additional embodiment, the winding pattern is formed using a payout roller that rolls the wire onto the tacky adhesive layer while applying the pressure. A roller can preferably be used to payout the wire at high speed and pressuring it against the tacky film adhesive on the form. The payout roller may also be used to rotate about the axis of the robot faceplate so as to change and control the windings direction to create the winding pattern If a structural adhesive is utilized for the tacky adhesive layer, it may be post cured to provide a sufficient bonding between the wires and form for torque generation. However, in some cases it may be preferable to utilize a pressure sensitive adhesive instead due to higher tack and no need to post cure. Pressure sensitive adhesives may not have sufficient lap shear strength alone for operation of the motor-generator. In radial gap motor-generators, this can be overcome by overwrapping the windings with a hoop tensioned layer. In a further embodiment of the invention, the motor-generator comprises a radial armature airgap and the substantially nonmagnetic armature form comprises a tube. The process further comprises over-wrapping the windings with a hoop tensioned layer that radially squeezes the wire against the tacky adhesive layer after completion of the winding pattern. In a simple form the layer may be just a layer of tape that increases the resistance of the windings to moving in operation. Acrylic or silicone adhesive, polyester tape is one such tape that can be used. Fiber reinforced layers can be alternatively used for increased strength. Preferably, the tensioned layer is applied with a tension force per axial length exerting radial compression on the substantially nonmagnetic armature form that is less than the first diametral critical buckling load of the tube. This prevents the air core armature from becoming egg shaped from application of the tensioned layer.

In other embodiments of the invention, the process for assembly of a brushless motor-generator comprises assembling a rotor formed from two spaced apart rotor portions having magnetic poles that drive magnetic flux circumferentially through the rotor portions and back and forth across an armature airgap formed between the rotor portions. The process further comprises forming an air core armature by coating a substantially nonmagnetic armature form with a tacky adhesive layer, and winding armature windings into a winding pattern on to the substantially nonmagnetic form using wire comprised of multiple individually insulated conductor strands that are electrically connected in parallel but are electrically insulated from each other along their length when located inside the armature airgap. This wire construction provides the benefits of flexible windings wire for high speed winding and at the same time precludes development of significant eddy current losses in the air core armature. The windings are preferably applied to the substantially nonmagnetic armature form by a parallel kinematic robot that moves in the winding pattern, dispenses the wire and sequentially applies pressure to sections of the wire against the tacky adhesive layer, wherein tack of the tacky adhesive layer holds the wire to the substantially nonmagnetic armature form while during the winding process, in the winding pattern later required for magnetic torque generation. The air core armature is inserted into the armature airgap and mounted to the stator of motor-generator for production of magnetically induced torque between the rotor and stator.

The process can be utilized for production of both radial gap and axial gap air core motor-generators. For radial gap motor generator manufacturing, the armature is preferably supported by an additional robot axis. In this embodiment of the invention, the motor-generator comprises a radial armature airgap and the substantially nonmagnetic armature form comprises a tube. The parallel kinematic robot comprises parallel arms that move a winding head to dispense the wire and to apply pressure to the wire against the tacky adhesive layer on the substantially nonmagnetic armature form. The process further comprises supporting the substantially nonmagnetic armature form by an additional motorized axis to rotate about the axis of the tube while adjacent to the winding head and allowing formation of the winding pattern of the windings around the circumference of the tube.

Parallel kinematic robots may substitute some motion precision for speed compared to serial type robots. In order to ensure accurate bonding pressure between the windings and the substantially non-magnetic form, without over-compression and damaging of the form, another embodiment of the invention utilizes the addition of a spring force pressure compensating head on the parallel robot faceplate to reduce variation the applied pressure. This can be a spring or alternatively a pneumatic cylinder with set pressure. For highest performance motor-generators, the armature form is preferable thin so as to minimize the armature airgap and increase the magnetic flux density. Armature form material is preferably substantially nonmagnetic so as to not increase losses or distort the airgap flux field. Preferable materials include plastic such as polycarbonate as well as fiberglass composite which has the benefit of increased stiffness, strength and heat resistance.

The windings wire may be contained on a relatively heavy spool for motor-generator production. Likewise the payout speed of the wire by the parallel robot may vary substantially when traversing active regions and end turns. As a result, the inertial of the spool can result in very high changes in tensions as well as over-spooling. To prevent this and allow high speed windings, and in additional embodiment, the wire is dispensed from a spool that feeds the parallel kinematic robot, whereby the spool does not rotate to dispense wire and a tensioner adds tension to the wire after being dispensed from the spool. One method accomplishing this is by using a center pull spool for the winding wire. Tension can be applied by fixed bars or rollers after being dispensed from the spool.

Winding patterns for the electromagnetic toque production can use conventional coils, however a more preferable pattern and further embodiment is for the parallel kinematic robot moves to apply the windings to the stator portion in a serpentine winding pattern wherein windings of a single phase are wound by traversing multiple times around the circumference of the stator portion. This winding pattern allows for high speed winding, continuous phase windings without the need for interconnection of coils of a given phase and with minimized end turn overlapping of different phases

DESCRIPTION OF THE DRAWINGS

The invention and its many advantages and features will become better understood upon reading the following detailed description of the preferred embodiments in conjunction with the following drawings, wherein.

DESCRIPTION OF THE PREFERRED EMBODIMENT

Figure 1:
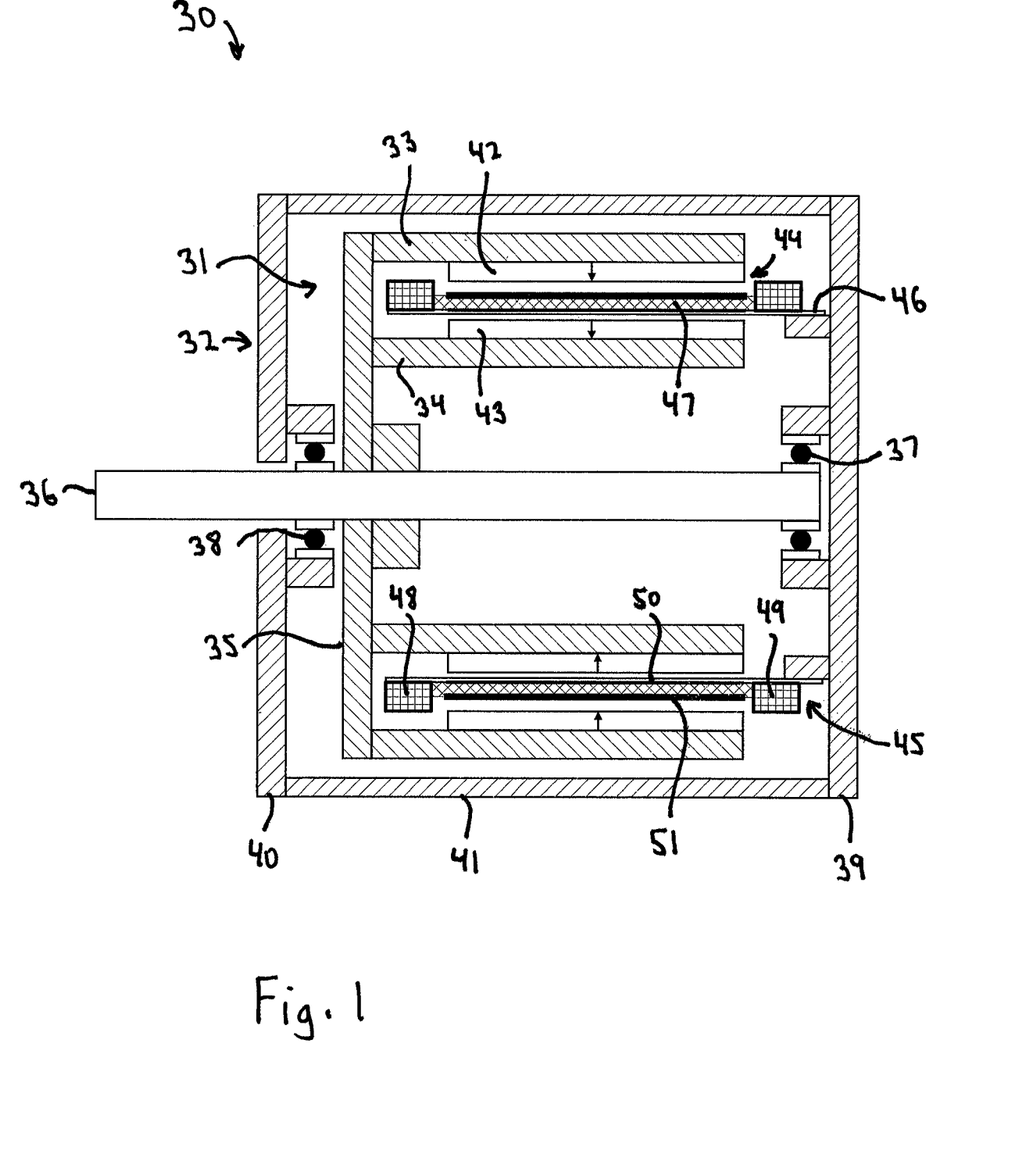
FIG. 1 is a cross-sectional drawing of a radial gap air core motor-generator in accordance with the invention.
Figure 7:
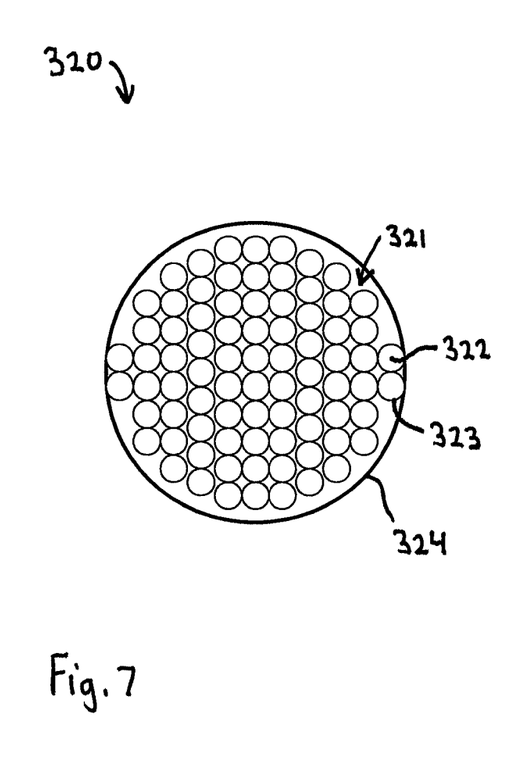
FIG. 7 is a schematic drawing of the cross-section of wire for use in an air core motor-generator in accordance with the invention.

Turning to the drawings, wherein like reference characters designate identical or corresponding parts, FIG. 1 shows an air core motor-generator 30 comprised of a rotor 31 and a stator 32. The rotor 31 is constructed of two concentric spaced apart steel rotor cylinders 33, 34 that are attached to a hub 35. The hub 35 is supported by center shaft 36 journaled for rotation by bearings 37, 38. The bearings 37, 38 are mounted in housing end plates 39, 40 which are connected together by outer housing tube 41. Attached to the rotor tubes 33, 34 are circumferential alternating polarity permanent magnet arrays 42, 43 that drive magnetic flux back and forth between the rotor tubes 33, 34 and an armature airgap 44 created between the rotor tubes. Located within the armature airgap 44 is an air core armature 45 that is attached to the stationary housing end plate 39. The air core armature 45 is constructed of a nonmagnetic form tube 46 that extends into the armature airgap 44 and is used to support multiple phase winding active lengths 47. The windings 47, 48, 49 are wound with wire comprised of multiple strands that are electrically connected in parallel but are electrically insulated from each other along their length when located inside the armature airgap 44. The strands are preferably held together and protected against insulation damage by an outer serve 324, as shown in FIG. 7. The winding active lengths 47 are adhered to the form 46 through use of a pressure sensitive adhesive 50 during the winding process. The pressure sensitive adhesive 50 may preferably comprise a B-staged thermoset film adhesive that is adhered to the form 46 prior to winding and is preferably warmed to increase adhesion of windings active lengths 47 to the form 46 during winding. The windings 47, 48, 49 comprise active lengths 47 that are run axially with multiple phases lying in a single layer and are located within the armature airgap 44 and receive the magnetic flux from the magnetic arrays 42, 43. The windings 47, 48, 49 also comprise end turns 48, 49 that run circumferentially, overlap multiple phases and are located outside of the armature airgap 44. An outer tensioned overwrap 51 of fiberglass/epoxy may also be used to wrap the windings active lengths 47 and preferably compress them to shrink the required thickness of the armature airgap. After winding, the windings active lengths 47 are preferably permanently secured to the form either through curing the film adhesive 50, by the overwrap 51, or by both.

Figure 1A:
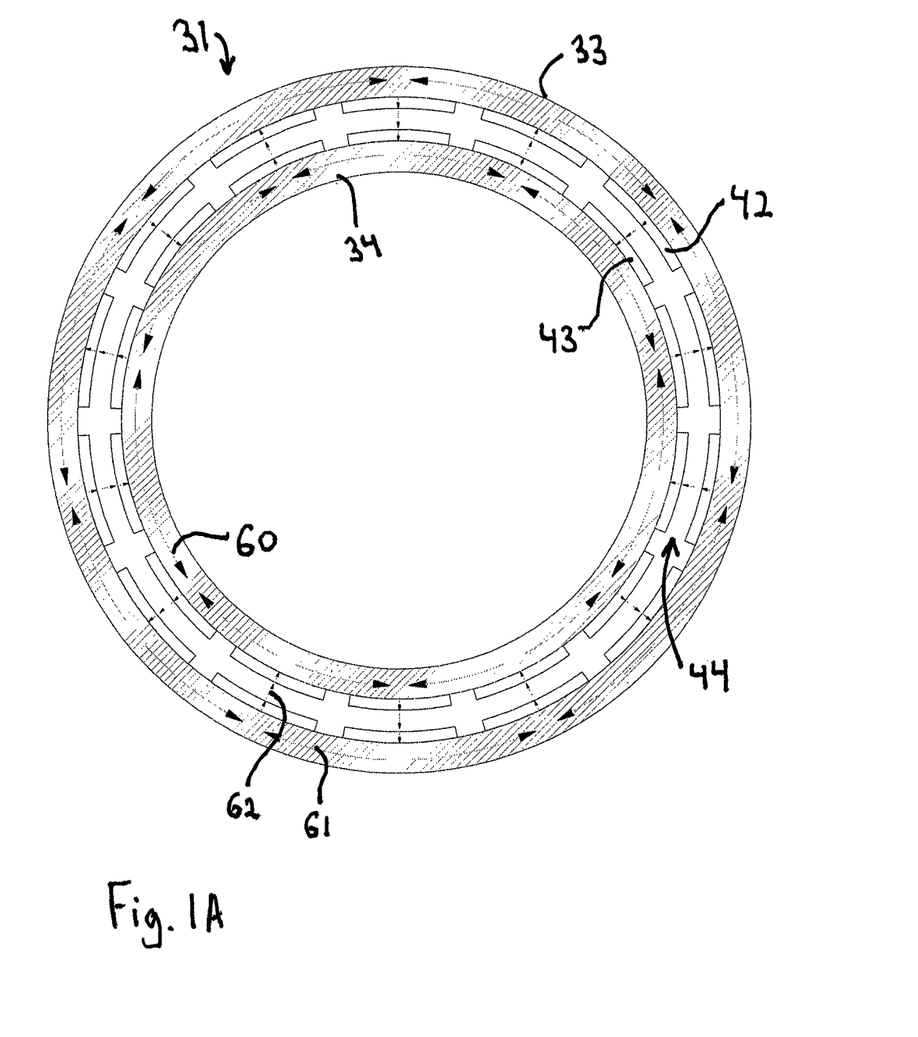
FIG. 1A is a cross-sectional drawing of the end view of the motor-generator rotor of FIG. 1.

A schematic drawing of the end view of the rotor of the radial gap air core motor-generator of FIG. 1 is shown in FIG. 1A. The rotor 31 is comprised of two spaced apart rotor portions 33, 34 constructed of steel and having magnets 42, 43 that drive magnetic flux circumferentially, as shown at 60, 61 through the rotor portions and radially, as shown at 62 across the armature airgap 44.

Figure 2:
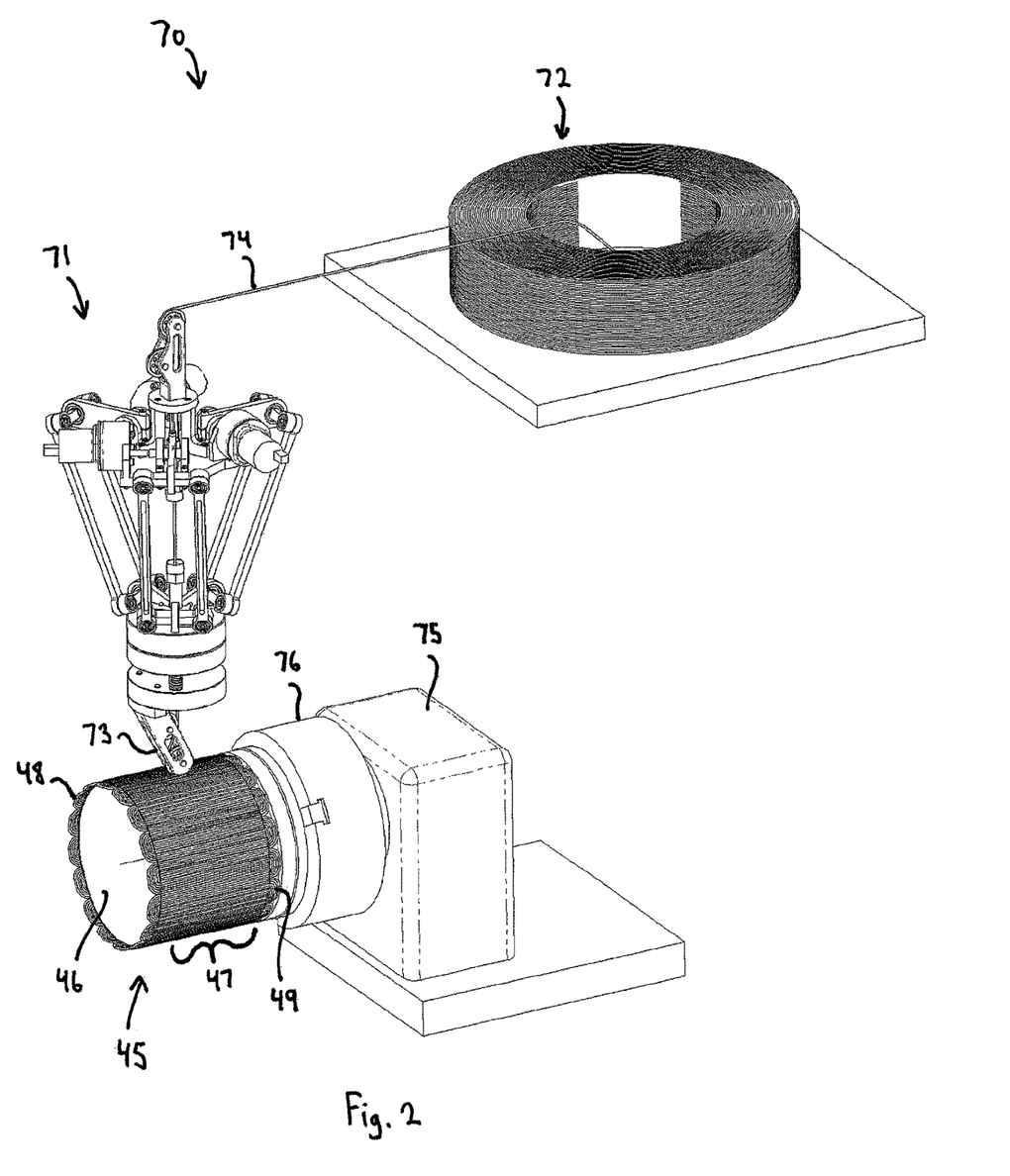
FIG. 2 is a perspective drawing of an armature manufacturing process for production of armatures for use in the radial gap air core motor-generator of FIG. 1 in accordance with the invention.

An apparatus for production of armatures for use in the air core motor-generator of FIG. 1 in accordance with the invention is shown in FIG. 2. The process comprises the use of a parallel link robot such as a delta robot 71, shown in more detail in FIG. 3, in which the major mechanical axes act on the robot faceplate in parallel rather than in series. This allows for both quick and precise movements and as such delta robots are currently used predominantly for pick and place operations for order fulfillment. As shown in FIG. 2, the delta robot is uniquely used to place specially constructed wire and to also feed out the wire and to uniquely apply pressure to the wire against an armature stator 45, wherein the stator has an applied pressure sensitive adhesive to hold the windings temporarily in a shape for later electromagnetic torque production. The windings of multiple phases are wound onto the stator and the pressure sensitive adhesive holds the active length portions of the windings temporarily in place during the winding process. The end turns, which do not generate electromagnetic torque with the rotor, are located outside of the magnetic airgap and are necessarily overlapping.

As shown in FIG. 2, the armature manufacturing process 70 uses a delta robot 71 to wind special multiple individually insulated strand conductor wire 74 from a spool 72 on to an air core armature 45. The spool can be of conventional rotating outer pull type or more preferably a non-rotating version such as center pull to eliminate the effects of rotating spool inertia and tension control variation during the high speed winding process. The delta robot has a payout head 73 that feeds out the wire 74 and pressures the active length windings 47 against the pressure sensitive adhesive 50 on the armature form 46. At each end of the form 46, the payout head 73 forms the end turns 48, 49. The windings 47, 48, 49 are preferably wound as serpentine patterns whereby each phase is constructed by winding multiple times around the circumference of the armature 45. The benefit of this winding pattern is a minimized windings length and resistance and also a minimum number of required electrical connections. In an additional preferred embodiment, each of the phases is wound consecutively and is subsequently cut to produce each separate phase winding. After completing a single phase, the payout 73 can feed out a loop of extra wire before starting the winding of the next phase and this loop can be cut after completion of the winding process to yield individual phases having leads. The winding process also includes a headstock 75 with chuck 76 that holds the armature form 46 and rotates precisely and in unison with the motions of the payout to create the windings pattern. To minimize the twisting in the wire 74 between the spool 72 and payout 73, it may be desirable that the winding direction of the headstock 75 be alternated between the winding of successive phases. After winding is completed, the windings are preferably permanently secured either by curing the adhesive, overwrapping the windings or other means. It is also possible that a pressure sensitive adhesive could be used that has sufficient adhesion and temperature capability that does not require curing. However, a crosslinked thermoset adhesive would generally provide the highest strength and temperature capability.

Figure 2A:
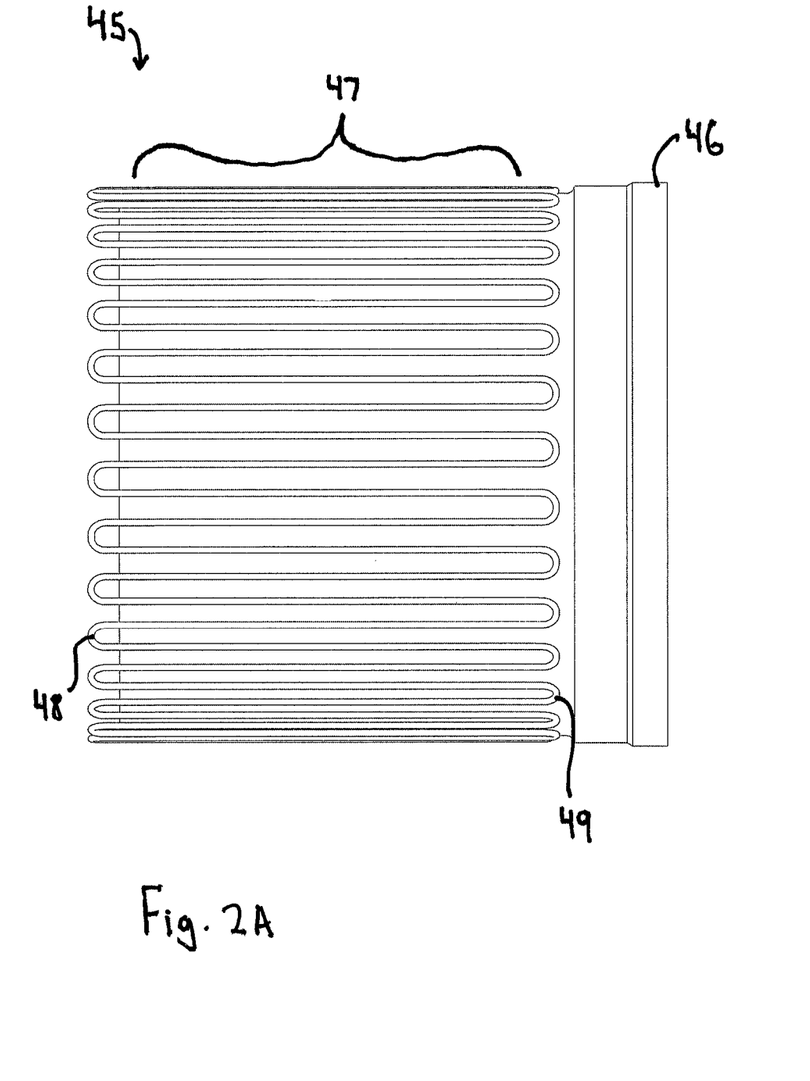
FIG. 2A is a schematic drawing of the preferred winding pattern of the radial gap air core armature of FIG. 2.

A schematic drawing of the preferred winding pattern of the radial gap air core armature of FIG. 2 in accordance with the invention is shown in FIG. 2A. The air core armature is comprised of a fiberglass reinforced polymer tube 46. Windings comprise active length portions 47, that will be located within the magnetic flux for torque generation, and end turns 49 and 49 at the ends of the form. The winding wire 74 is adhered to the circumference of the form 46 in a serpentine path using the tackiness of the pressure sensitive adhesive film. Typical construction most commonly winds three phases of windings.

Figure 3:
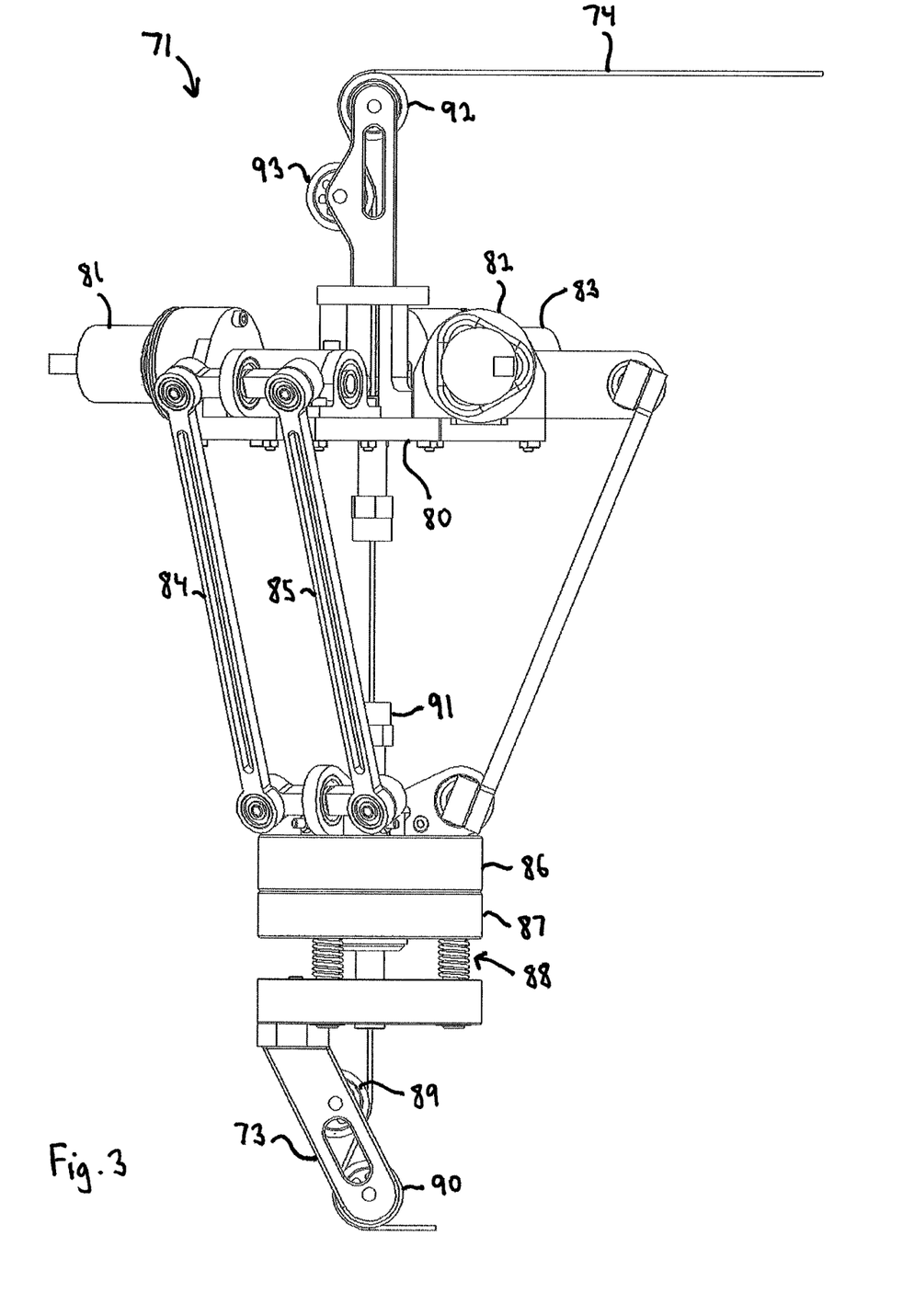
FIG. 3 is an elevation drawing of an air core armature winding machine for use in the production process of FIG. 2.

A schematic drawing of the apparatus 71 for air core armature manufacturing for use in the production process of FIG. 2 in accordance with the invention is shown in FIG. 3. The manufacturing machine 71 comprises a delta robot with 3 axes motors 81, 82, 83 that are attached to a support plate 80 and together move the faceplate 86 in Cartesian coordinates through the use of parallel arms 84, 85. Armature winding speeds of up to 10 meters per second may be possible by the use of parallel links as opposed to serial link type robots. An additional payout directional axis device 87 may be attached to the faceplate 86 that can control the windings out-feed direction. Attached to the payout directional axis device 87 can also include a pressure control head 88 that enables more uniform pressure of the payout 73 to the windings when adhering them to the pressure sensitive adhesive. The pressure sensitive head 88 can be a spring, pneumatic cylinder or other mechanism that regulates the pressure between the wire and armature form during the adhering the active length portions 47 to the armature form 46.

The windings wire 74 is fed into the center of the delta robot 71 through pulley wheels 92, 93 and travels perpendicularly to the faceplate 86. Holes in the faceplate 86, payout directional axis device 87 and pressure control head 88 allow the wire to feed directly to the payout 73. Pulley wheels 89, 90 feed out the wire 74 to the armature 45, control the windings direction and apply pressure to the wire to adhere active length portions 47 to the pressure sensitive adhesive 50 on the armature form 46. A wire feed system such as pinch rollers 91 can be included to pull the wire 74 from the spool and to force feed the wire out the payout 73. The wire feed system 91 enables the looping required at end turns 48, 49 of the windings.

Figure 4:
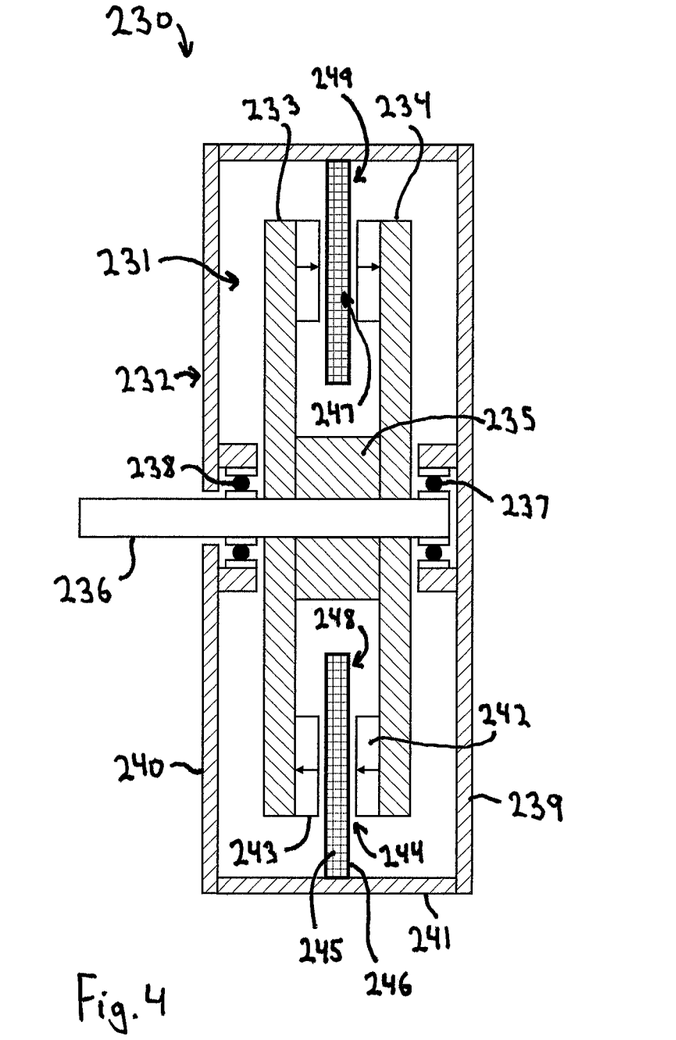
FIG. 4 is a cross-sectional drawing of an axial gap air core motor-generator in accordance with the invention.

As shown in FIG. 4, the armature 245 of the axial gap air core motor-generator 230, is constructed as a flat disk. The axial gap motor-generator 230 is comprised of a rotor 231 and a stator 232. The rotor 231 is formed from two spaced apart steel disks 233 and 234 that are connected by a central hub 235. The rotor 231 is journalled for rotation by bearings 237 and 238 which are supported by the housing end plates 239, 240. Outer housing tube 241 connects the housing end plates 239, 240 and also supports the air core armature 245 within the armature airgap 244 through mount connection 246. The air core armature 245 comprises active length portions 247 and inner and outer end turn portions 248, 249. Located on the two rotor disks are permanent magnets 242, 243 that drive magnetic flux circumferentially through the rotor portions 233, 234 and across the armature airgap 244. It is also possible to utilize rotor disks 233, 234 not constructed from steel, wherein the magnets 242, 243 would utilize a Halbach array to conduct the flux circumferentially on the rotor.

Figure 5:
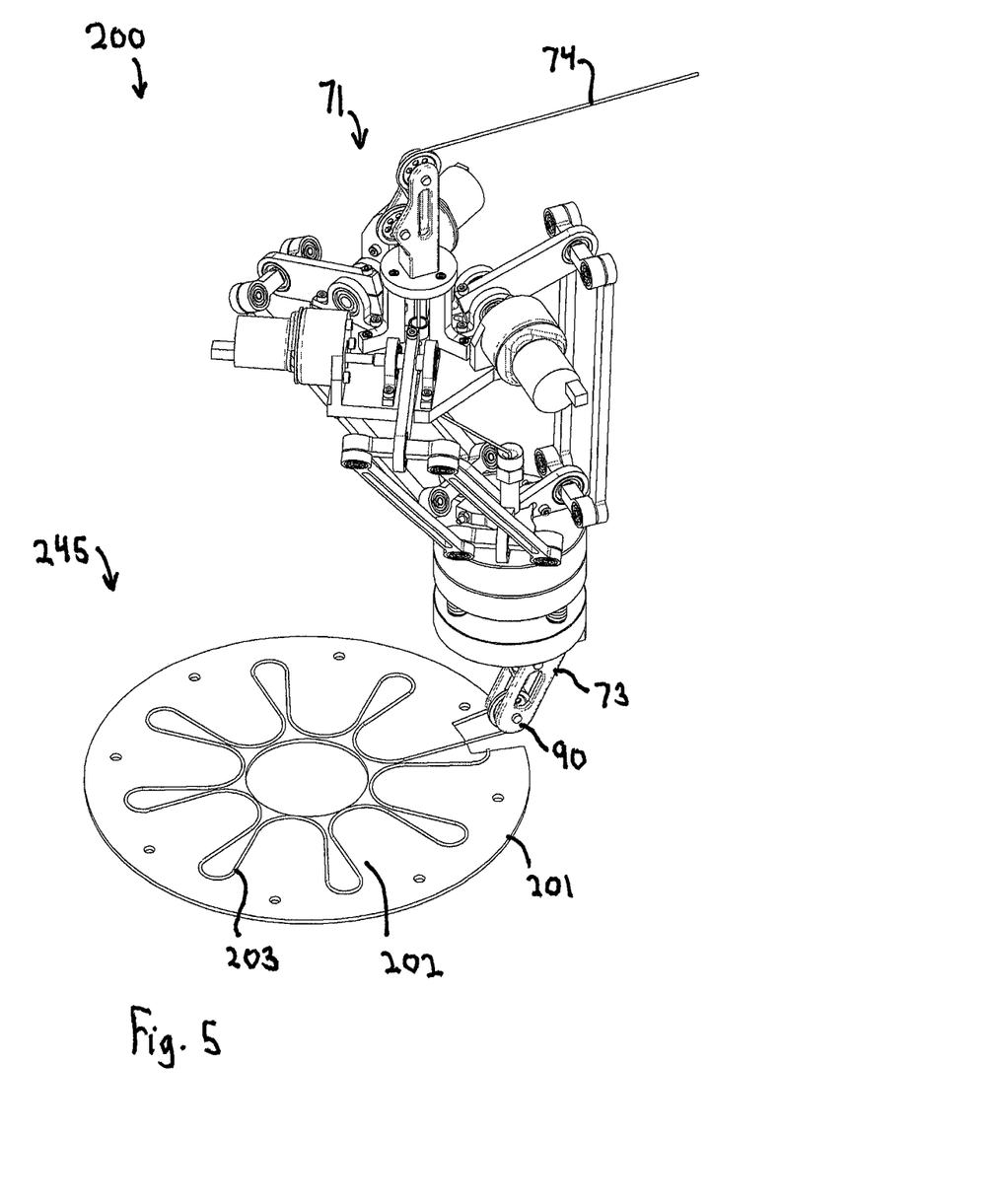
FIG. 5 is a perspective drawing of an armature manufacturing process for production of armatures for use in the axial gap air core motor-generator of FIG. 4 in accordance with the invention.

A schematic drawing of an armature manufacturing process for production of armatures for use in the axial gap air core motor-generator of FIG. 4 in accordance with the invention is shown in FIG. 5. The manufacturing process 200 uses a parallel kinematic robot 71 to wind the windings wire 74 onto the air core armature 245. The armature form 201 is constructed of a flat sheet of fiberglass reinforced epoxy with a surface layer of B-staged epoxy film adhesive 202. To increase the tackiness of the film adhesive 201 while winding, the ambient temperature may be increased. The parallel kinematic robot 71 has a payout head 73 with payout roller 90 that forms the winding pattern 203 by moving in the desired pattern and applying pressure to the windings wire 74 against the tacky adhesive layer 202 and substantially non-magnetic form 201. After completion of winding the air core armature 245, it is preferably over cured to increase the lap shear strength between the winding wire 74 and form 201.

Figure 6:
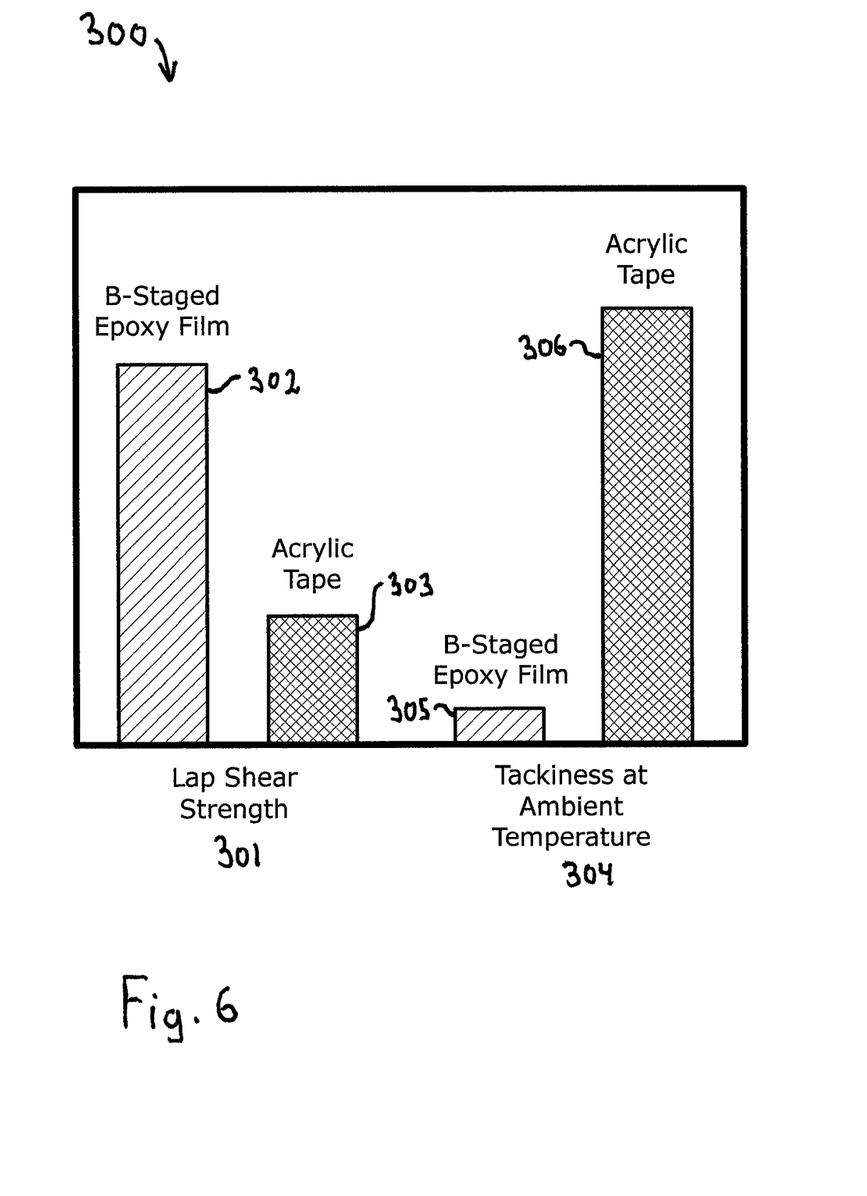
FIG. 6 is a comparison chart between different types of tacky adhesive layers for use in the armature manufacturing process in accordance with the invention.

Polymer adhesives are available in a wide range of types. There are two critical requirements for the tacky adhesive layer for use in accordance with the invention, which are lap shear strength in operating conditions of the motor-generator and the tackiness at ambient or winding temperature during the winding manufacturing process. A comparison chart between different types of tacky adhesive layers for use in the armature manufacturing process in accordance with the invention is shown in FIG. 6. Structural adhesives such as B-staged epoxy film 302 show high lap shear strength compared to pressure sensitive adhesives such as acrylic tape 303. However there is a tradeoff with between operating strength and the winding process ease. B-staged epoxy film 305 shows much lower tackiness at ambient temperature 304 than the acrylic tape 306, making the windings more difficult to adhere to the substantially non-magnetic forms. Low tackiness can be overcome through increasing the temperature during the winding process. Likewise, low lap shear strength can be overcome with the addition of tensioned overlap layer. One advantage of the pressure sensitive adhesive is the lack of requiring curing. New polymer adhesive formulations are now available that are hybrids and can also be advantageously used.

A schematic drawing of the cross-section of wire for use in an air core motor-generator in accordance with the invention is shown in FIG. 7. The wire 320 is comprised of multiple individually insulated conductor strands 322 that are electrically connected in parallel but are electrically insulated from each other along their length 323 when located inside said armature airgap. This construction uses insulation 323 to isolate the small strands 322, which may be several hundred in number, from each other electrically when exposed to the changing magnetic field in the armature airgap. The benefit is that while the strands of the wire 320 may be electrically in parallel by connections outside of the magnetic flux, they are precluded from generating large eddy current losses in the armature airgap. To prevent damage to the strand insulation 323 of the actual strands 322, an outer serve 324 is preferably used to hold the wire bundle 320. Serves can include Mylar tape, nylon thread and other constructions. An additional benefit of the outer serve 324 is that it facilitates high speed winding process by the parallel kinematic robot. In some cases, it can be further desirable to apply a layer of thermoplastic coating 321 on top of the strand insulation 323. The coating 321 can be used to bond the strands 322 together through heating and increase the rigidity of the flexible windings with the form after the completion of the winding patterns on the form.

Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims, wherein

We claim:

1. A process for assembly of a brushless motor-generator comprising:
    assembling a rotor with magnetic poles for driving magnetic flux circumferentially through said rotor and back and forth across an armature airgap formed with said rotor;
    forming an air core armature by coating a stator with a tacky adhesive layer, and winding armature windings into a winding pattern on to said stator using wire comprised of bundled multiple individually insulated conductor strands that are electrically connected in parallel but are electrically insulated from each other along their length where located inside said armature airgap;
    said winding comprising sequentially applying pressure to said wire against said tacky adhesive layer, wherein said tacky adhesive layer holds said wire to said stator in said winding pattern in both the winding process and in transfer of electromagnetically induced torque to said stator in operation of said motor-generator; and
    assembling said stator and said rotor together for production of magnetically induced torque between said rotor and said stator in said motor-generator.

2. A process for assembly of a brushless motor-generator as described in claim 1, wherein:
    said tacky adhesive layer comprises a B-staged thermoset polymer film and heat is applied to said stator after said winding pattern is completed causing the bond strength of said armature windings to said stator to be increased.

3. A process for assembly of a brushless motor-generator as described in claim 1, wherein:
    said armature windings comprise multiple phases and windings of a single phase are wound by traversing multiple times around the circumference of said stator.

4. A process for assembly of a motor-generator as described in claim 1, wherein:
    a robot applies said pressure to said wire while moving in said winding pattern and adhering said wire to said stator as said wire is dispensed.

5. A process for assembly of a brushless motor-generator as described in claim 1, wherein:
    said armature airgap is radial and said armature windings are applied to a radial facing surface of said stator.

6. A process for assembly of a brushless motor-generator as described in claim 5, wherein:
    said armature windings are overwrapped by a resin-impregnated tensioned band after winding which compresses both said bundled multiple individually insulated conductor strands and said wire against said tacky adhesive layer.

7. A process for assembly of a brushless motor-generator as described in claim 1, wherein:
    said armature airgap is axial and said armature windings are applied to an axial facing surface of said stator.

8. A process for assembly of a brushless motor-generator comprising:
    assembling a rotor with magnetic poles for driving magnetic flux circumferentially through said rotor and back and forth across an armature airgap formed with said rotor;
    forming an armature by coating a slotless stator with a tacky adhesive layer, and winding armature windings into a winding pattern on to said slotless stator using wire comprised of bundled multiple individually insulated conductor strands that are electrically connected in parallel but are electrically insulated from each other along their length where located inside said armature airgap;
    said winding comprising serially applying pressure to said wire against said tacky adhesive layer as said wire is dispensed in said winding pattern, wherein said tacky adhesive layer imparts holding force of said wire to said slotless stator in said winding pattern for both the winding process and for transfer of electromagnetically induced torque to said slotless stator in the operation of said motor-generator; and assembling said stator and said rotor together for production of magnetically induced torque between said rotor and said stator in said motor-generator.

9. A process for assembly of a brushless motor-generator as described in claim 8, wherein:
    said slotless stator comprises a nonmagnetic armature form that is supported in said armature airgap between two opposing surfaces of said rotor, whereby said magnetic flux traverses back and forth between said between said opposing surfaces and through said armature windings.

10. A process for assembly of a brushless motor-generator as described in claim 8, wherein:
    a robot applies said pressure to said wire while moving in said winding pattern and adhering said wire to said slotless stator as said wire is dispensed.

11. A process for assembly of a brushless motor-generator as described in claim 8, wherein:
    said bundled multiple individually insulated strands of said wire are diametrically held together with an outer serve and said tacky adhesive layer adheres to said serve whereby said tacky adhesive layer imparts holding force of said wire to said slotless stator in said winding pattern.

12. A process for assembly of a brushless motor-generator as described in claim 8, wherein:
    said bundled multiple individually insulated conductor strands include a layer of thermoplastic polymer coating, and said strands are heated and bonded to each other after said wire is adhered to said slotless stator in said winding pattern.

13. A process for assembly of a brushless motor-generator as described in claim 8, wherein:
    said tacky adhesive layer comprises a B-staged thermoset polymer film and heat is applied to said slotless stator after said winding pattern is completed causing the bond strength of said armature windings to said slotless stator to be increased.

14. A process for assembly of a motor-generator as described in claim 8, wherein:
said armature airgap is radial and said armature windings are applied to a radial facing surface of said slotless stator, whereby active lengths of said armature windings run axially with multiple phases lying in a single layer and adhered to said slotless stator.

15. A process for assembly of a brushless motor-generator comprising:
assembling a rotor with magnetic poles for driving magnetic flux circumferentially through said rotor and back and forth across an armature airgap formed with said rotor;
forming an airgap armature by winding armature windings into a winding pattern on to a stator with a coated adhesive layer thereon, using wire comprised of bundled multiple individually insulated conductor strands that are electrically connected in parallel but are electrically insulated from each other along their length where located inside said armature airgap;
said winding comprising serially applying pressure to said wire against said stator as said wire is dispensed, wherein said adhesive successively holds said wire to said stator in said winding pattern both during the winding process and during transfer of electromagnetically induced torque to said stator in the operation of said motor-generator; and
assembling said stator and said rotor together for production of magnetically induced torque between said rotor and said stator in said motor-generator.

16. A process for assembly of a brushless motor-generator as described in claim 15, wherein:
said armature windings comprise active region portions running in radial or axial directions with windings of multiple phases occupying the same layer and adhered to said stator where inside said armature airgap.

17. A process for assembly of a brushless motor-generator as described in claim 15, wherein:
said bundled multiple individually insulated strands of said wire are diametrically held together with an outer serve and said adhesive adheres to said serve whereby said adhesive imparts holding force of said wire to said stator in said winding pattern.

18. A process for assembly of a brushless motor-generator as described in claim 15, wherein:
a robot applies said pressure to said wire while moving in said winding pattern and adhering said wire to said stator as said wire is dispensed.

19. A process for assembly of a brushless motor-generator as described in claim 15, wherein:
said armature airgap is radial and said armature windings are applied to a radial facing surface of said stator.

20. A process for assembly of a brushless motor-generator as described in claim 15, wherein:
said armature airgap is axial and said armature windings are applied to an axial facing surface of said stator.

* * * * *